July 23, 1940.　　　　A. H. CHURCH　　　　2,209,050
NOZZLE CLOSURE MEANS FOR CONTAINERS
Filed April 17, 1937　　　6 Sheets-Sheet 1
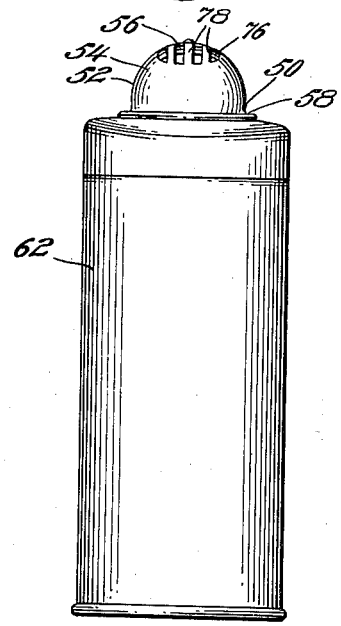
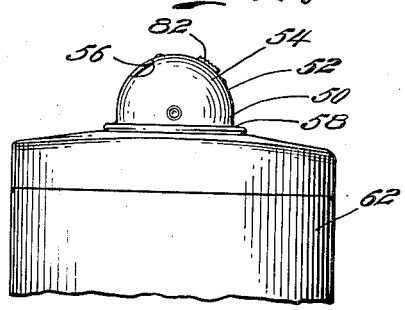
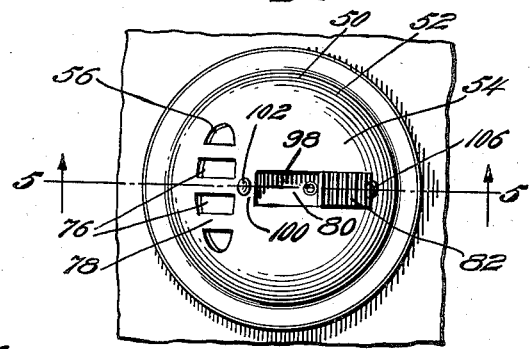
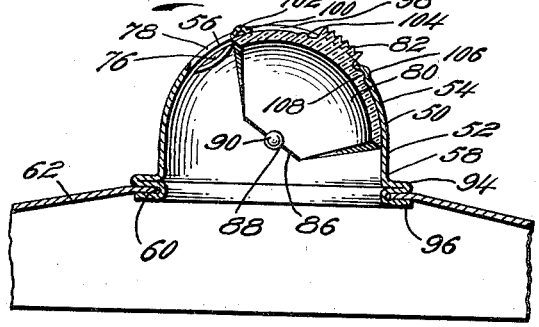
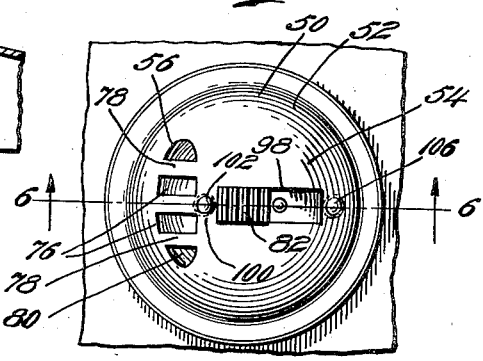
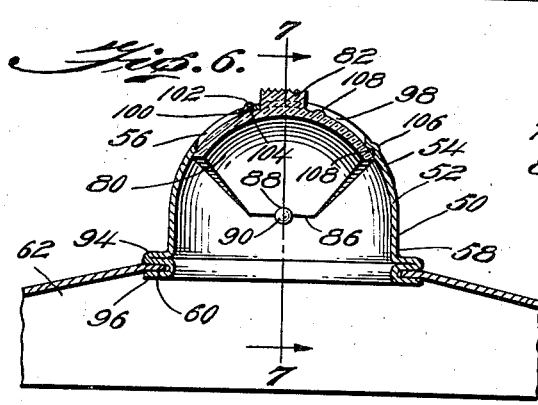
Inventor
Albert H. Church
By Thomas A. Jenckes
Attorney

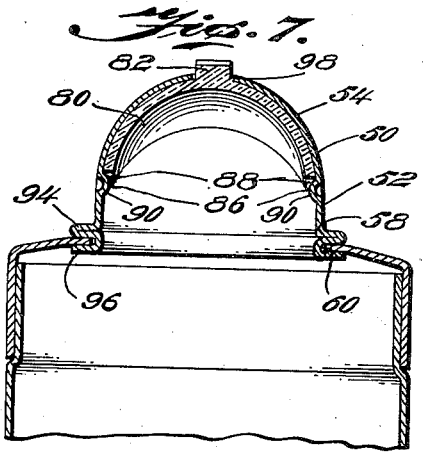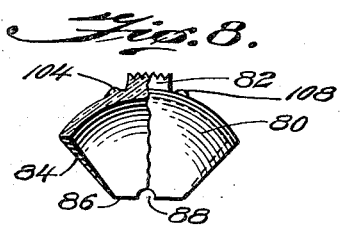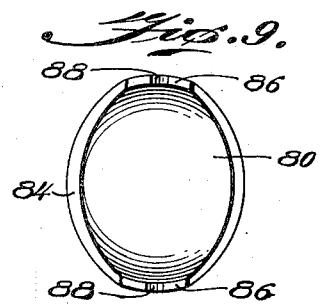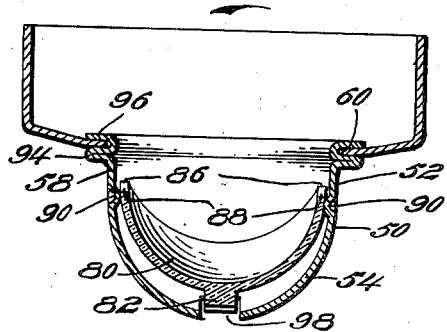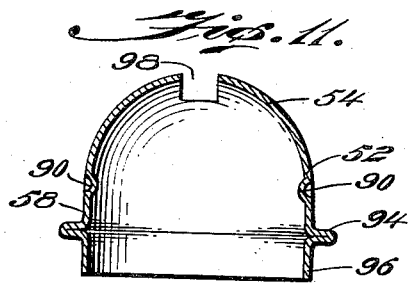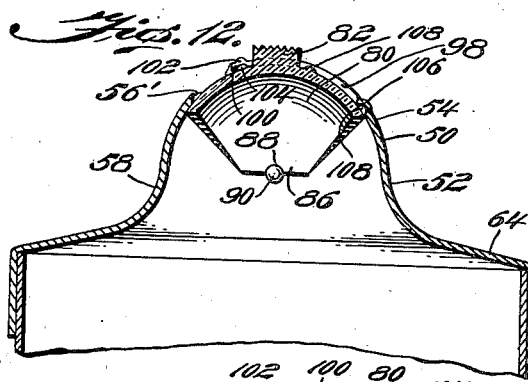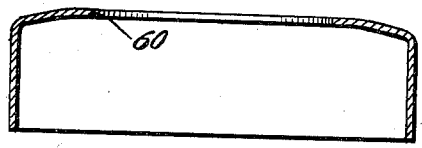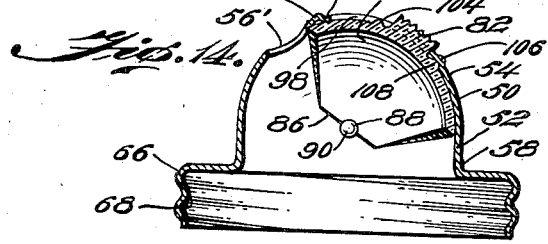

July 23, 1940.          A. H. CHURCH          2,209,050
NOZZLE CLOSURE MEANS FOR CONTAINERS
Filed April 17, 1937          6 Sheets-Sheet 3
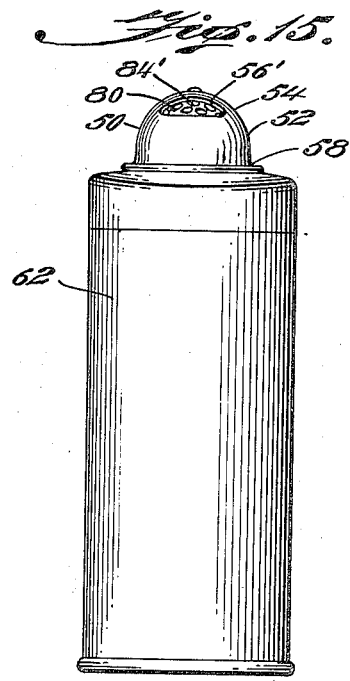
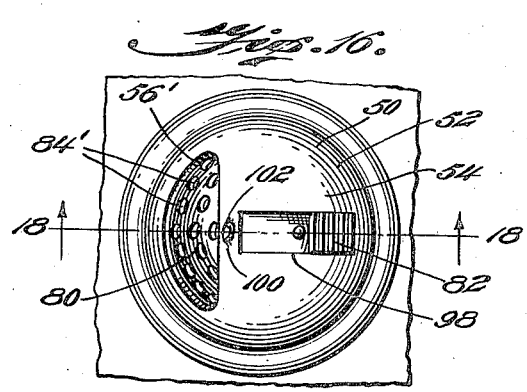
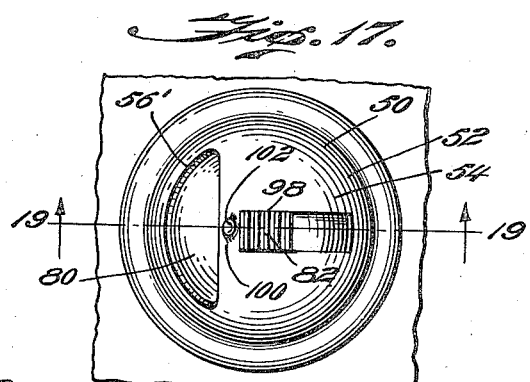
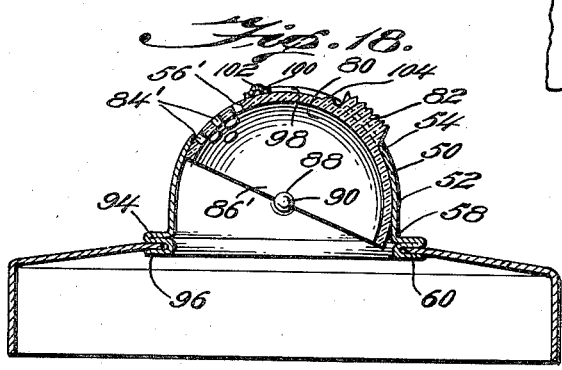
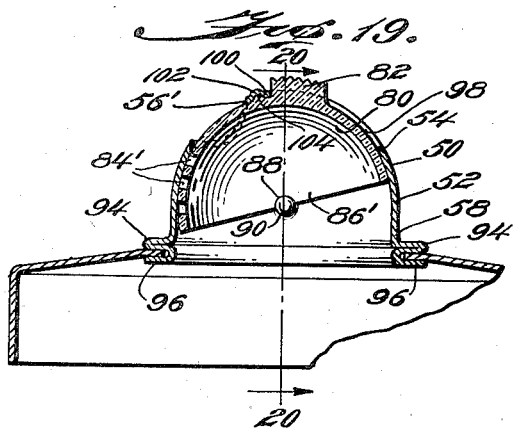
Inventor
Albert H. Church
By Thomas A. Jenkes
Attorney July 23, 1940.  A. H. CHURCH  2,209,050
NOZZLE CLOSURE MEANS FOR CONTAINERS
Filed April 17, 1937   6 Sheets-Sheet 4
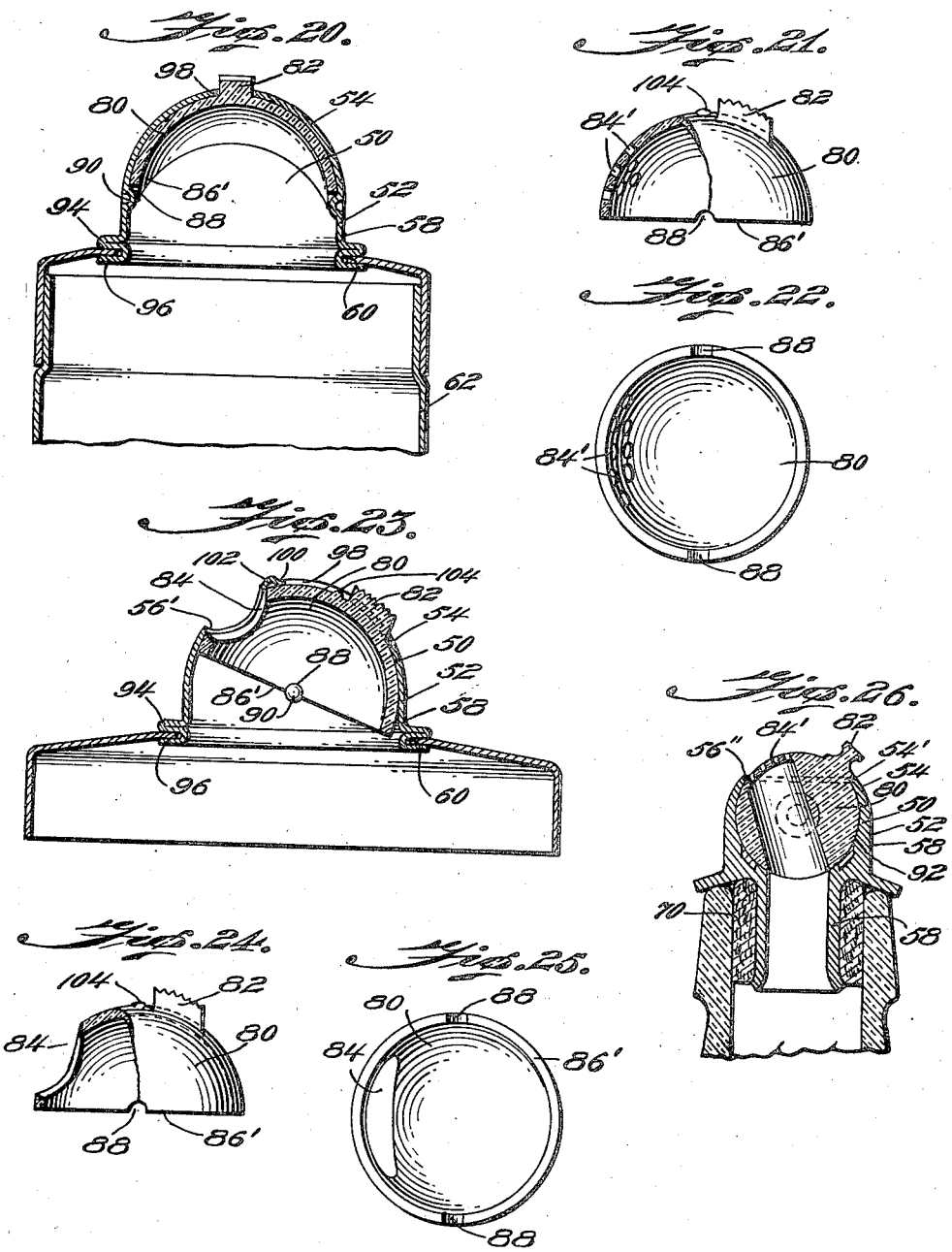
Inventor
Albert H. Church
By Thomas A. Jenckes
Attorney

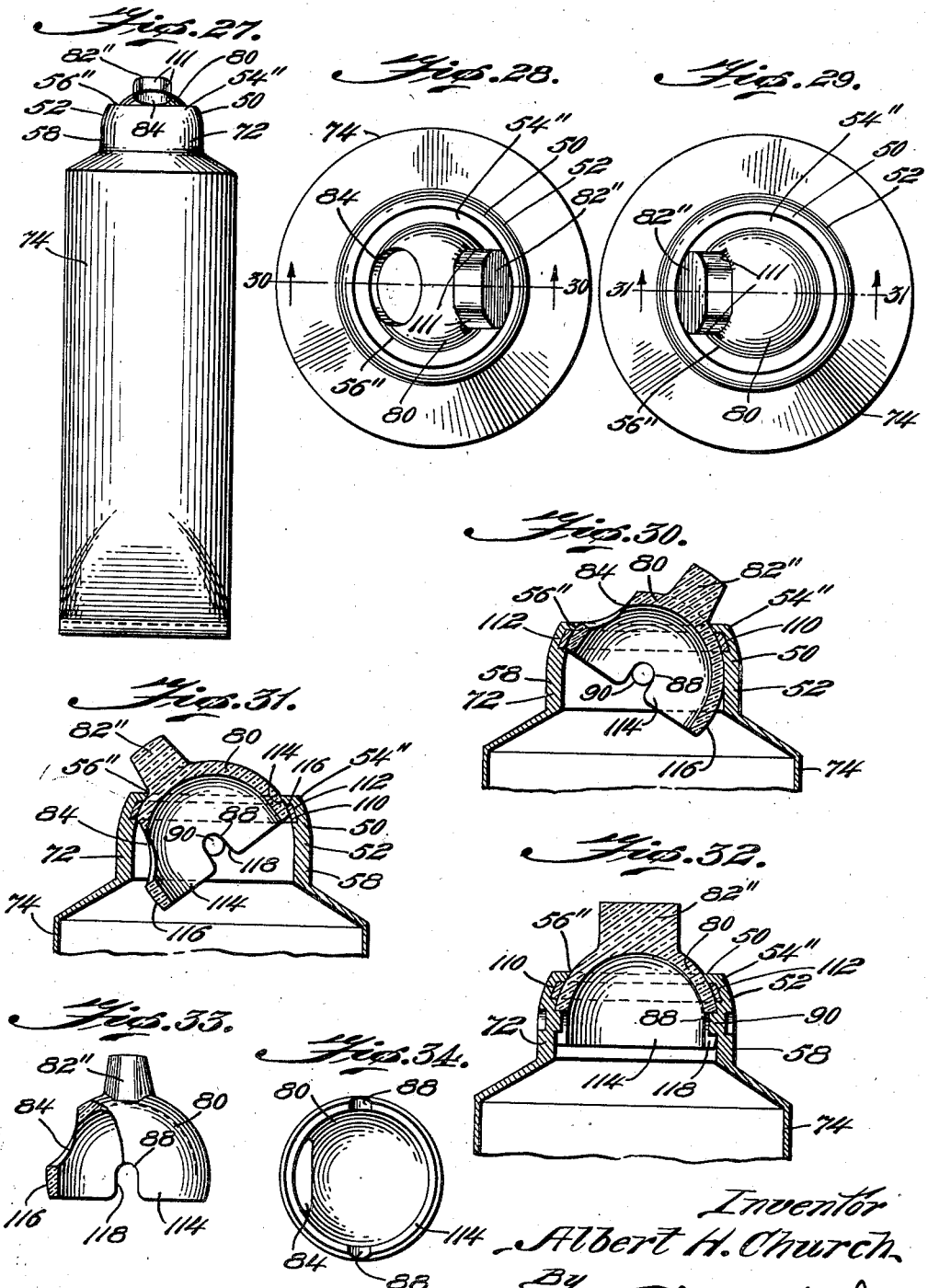

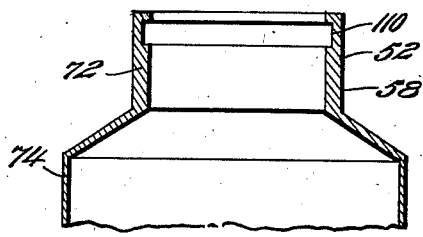
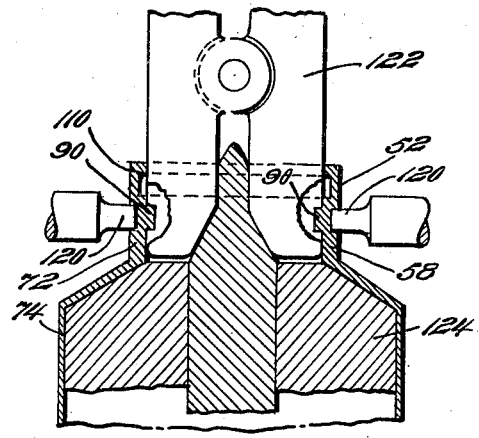
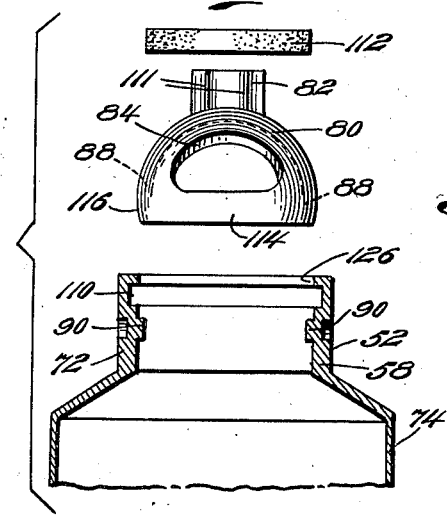
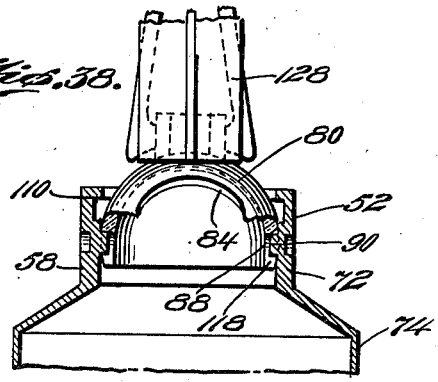
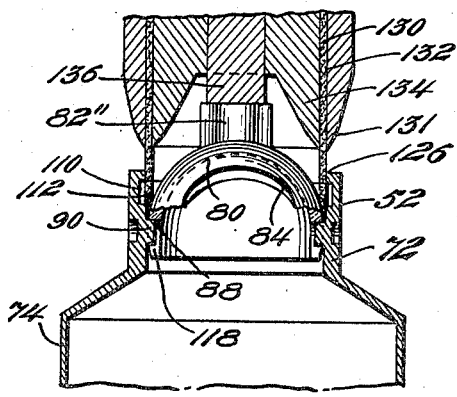
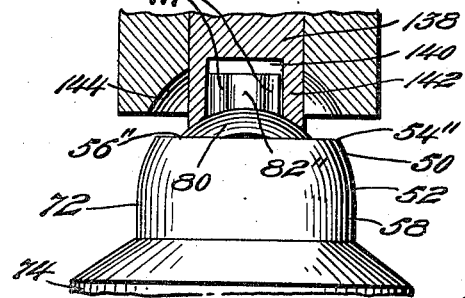

Patented July 23, 1940

2,209,050

UNITED STATES PATENT OFFICE 2,209,050

NOZZLE CLOSURE MEANS FOR CONTAINERS

Albert H. Church, Providence, R. I., assignor to No-Kap Closures (U. S. A.), Inc., Providence, R. I., a corporation of Rhode Island Application April 17, 1937, Serial No. 137,517

32 Claims. (Cl. 221—62)

My invention relates to improvements in nozzle closure means for a container and comprises certain novel features in the nozzle closure means itself whether it is adapted to be an integral or permanent part of the entire container such as in an extruded collapsible tube, an integral part of the top of the container as may be the case in a can top, or whether it is a separate nozzle part adapted to be sold as a unit for later attachment by the can or other container manufacturer to a perforation in the top wall of the can or container, or for use for securement to a bottle top or applied with a cork inwardly to the neck of the bottle or other container, or otherwise to the container.

My invention is in certain aspects thereof an improvement on the inventions disclosed in an application for patent of James Rest, for Containers for flowable materials, Ser. No. 678,133 filed June 29, 1933, now Patent No. 2,126,814, issued August 16, 1938, and divisional applications thereof for Containers for flowable materials, Ser. No. 134,162 filed March 31, 1937 now Patent No. 2,126,815, issued August 16, 1938, and Containers for flowable materials, Ser. No. 135,275 filed April 5, 1937 now Patent No. 2,127,308, issued August 16, 1938, the application of Albert H. Church, for Nozzle closure means for containers, bottles, tubes, cans and the like, and the method of its manufacture, Ser. No. 751,734 filed November 6, 1934 now Patent No. 2,127,465, issued August 16, 1938 and an application of James Rest, for Closures for bottles, collapsible tubes and like containers, Ser. No. 48,043 filed November 2, 1935, now Patent No. 2,127,489, issued August 16, 1938, an application of Albert H. Church, for Nozzle closure means for containers, Ser. No. 102,144 filed September 23, 1936, now Patent No. 2,127,390, issued August 16, 1938, an application of Elton C. Church, for Nozzle closure means for containers, bottles, cans and the like, Ser. No. 101,967 filed September 22, 1936, now Patent No. 2,127,389, issued August 16, 1938 and an application of Karl J. Rolle, for Nozzle closure means for containers and washers for use therein, Ser. No. 101,629 filed September 19, 1936, now Patent No. 2,127,424, issued August 16, 1938, comprising novel improvements of the structures shown therein and the methods of manufacture particularly as applied to can tops to provide a leak-proof structure and particularly comprising simplified improvements of the structures shown therein resulting in economy of manufacture.

My invention particularly comprises improvements in inner and outer nested cooperating relatively oscillatable inner and outer shell portions provided with suitable means formed diametrically thereof for solely supporting one shell relative to the other, specifically the inner shell within the outer shell to prevent said inner shell from dropping into the container and solely retaining it firmly against said outer shell in intimate nested leak-proof juxtaposition therewith and forming a horizontal diametric axle of oscillation for said inner shell, it being obvious that if desired, the same means may be provided to retain a relatively oscillatable outer shell in substantially leak-proof relationship against a relatively stationary inner shell in intimate nested leak-proof juxtaposition therewith and to form a horizontal diametric axis of oscillation therefor. It is apparent however that in the improved embodiment shown wherein such means is formed integrally diametrically of said inner and outer shells permitting relative oscillation of the inner shell relative to a stationary outer shell for dispensing purposes, that it will supplementally function to make an inner valve seat of the hemi-spherical outer shell to solely firmly retain the relatively oscillatable inner shell in intimate nested leak-proof juxtaposition therewith and supplementally form the sole means of support for the inner shell within the outer shell to prevent the inner shell from dropping into the container and thus entirely dispensing with the necessity for any lower valve seat as formerly thought necessary in most of the disclosures of the inventions aforesaid or other structures. An object of my invention therefore is to provide an improved type of nozzle construction which will permit a nozzle formation having a cylindrical wall projecting integrally downwardly from the outer hemi-spherical shell top portion thereof, whether it be the wall of a collapsible tube or a permanently attached integral container nozzle, or one adapted to be attached to any type of container later if desired.

A further object of my invention is to provide a nozzle closure means of this type having two relatively oscillatable substantially hemi-spherical portions, of neater appearance and more leak-proof construction than is possible if the relatively oscillatable shell member be mounted as the outer shell on top of an inner relatively stationary nozzle shell.

Further features of my invention are therefore, the provision of a nozzle closure means constructed of two simple parts the nozzle portion of which may be readily pressure shaped either by stamping, spinning or pressing sheet material or otherwise or by extruding ductile metal blanks, and the closure portion, valve or inner shell thereof may be also readily pressure shaped by molding it from plastic composition material or pressure shaping it from metal or otherwise pressing it if desired from sheet or other material. It is also apparent that as my invention comprises two simple parts, the cooperating portions thereof may be readily pressure shaped or formed so that such parts or portions thereof may perform supplemental functions for which it was formerly thought necessary to employ separate members.

A further object of my invention is to provide a two piece unit in which the parts thereof may be so pressure shaped or otherwise formed in the course of their manufacture as to permit of their easy assembly.

Further features of my invention are that it provides a construction readily adaptable for use with pulverant or granular powders, pastes or liquids, the employment of larger dispensing holes relative to the size of the nozzle parts than formerly thought possible and in general a structure of more attractive appearance than hitherto, more leak-proof than hitherto, in fact having such advantages to such a degree as to permit of greater utility thereby widening the fields of uses of nozzle closure means of this description and providing greater consumer convenience in dispensing material from containers than has been possible with the use of prior art structures.

Further features of my invention relate to the employment of a sector spherical shaped inner shell valve closure member of novel construction and the employment for the first time of a multi-perforate valve closure member and also I believe for the first time, of a perforate, uni- or multi-perforate inner shell valve member.

Further features of my invention relate to improvements in the structure of the inner and outer shells or nozzle and valve which permit of novel methods of their manufacture and assembly.

These and such other objects of my invention as may hereinafter appear may be best understood from a description of the embodiments thereof, such as shown in the accompanying drawings.

In the drawings, Fig. 1 is an end elevation of a powder can equipped with my invention employing an embodiment thereof having a multi-perforate outer shell for use in dispensing powder and showing my improved nozzle closure means permanently secured to a hole in the top of the can.

Fig. 2 is a side elevation of the top of the can shown in Fig. 1 with my improved nozzle closure means attached.

Fig. 3 is a plan view of the embodiment of nozzle closure means shown in Figs. 1 and 2 and adjacent can top portion and showing the inner shell or valve moved to a dispensing position.

Fig. 4 is a plan view similar to Fig. 3 showing the inner valve closure shell member relatively oscillated to a closed non-dispensing position.

Fig. 5 and Fig. 6 are vertical sectional views respectively taken along the lines 5—5 and 6—6 of Figs. 3 and 4.

Fig. 7 is a vertical sectional view taken along the line 7—7 of Fig. 6.

Fig. 8 is a side elevation partially shown in section of the improved type of spherical sector shaped inner shell valve closure member I employ in the embodiment shown in Figs. 1–7.

Fig. 9 is a reverse plan view of the improved valve shown in Fig. 8.

Fig. 10 is an inverted sectional view showing how the inner shell valve member may be snapped into assembled position with the structure of the embodiment shown in Figs. 1–7.

Fig. 11 is a vertical sectional view showing how my improved nozzle shown in Figs. 1–7 may be attached to a suitable hole in a can top.

Fig. 12 is a vertical sectional view of my improved nozzle closure means shown in Figs. 1–7 with the downwardly projecting wall of the nozzle formed as an integral part of a can top.

Fig. 13 is a vertical sectional view generally similar to Fig. 5 in which the outer shell is provided with a single uni-perforate dispensing opening in place of the multi-perforate dispensing hole means heretofore shown.

Fig. 14 is a vertical sectional view of the embodiment of my invention hitherto shown in which the nozzle wall projecting downwardly from the outer hemi-spherical shell is shaped with an enlarged and internally threaded lower end for screwing on the externally threaded upper end of a bottle neck or other container.

Fig. 15 is an end elevation similar to Fig. 1 of an embodiment of my invention employing a multi-perforate inner shell and uni-perforate outer shell.

Figs. 16 and 17 are respectively plan views of the improved embodiment of the nozzle closure means shown in Fig. 15 in respective open and closed positions.

Figs. 18 and 19 are respective vertical sectional views along the respective lines 18—18 of Fig. 16 and 19—19 of Fig. 17.

Fig. 20 is a vertical sectional view taken along the line 20—20 of Fig. 19.

Fig. 21 is a side elevation partially shown in section of the improved type of multi-perforate valve employed in the embodiment of my invention shown in Figs. 15-20.

Fig. 22 is a reverse plan view of the embodiment of valve shown in Fig. 21.

Fig. 23 is a vertical sectional view similar to Fig. 18 employing a uni-perforate sector shaped dispensing opening in the valve in place of the multi-perforate dispensing hole means shown in the valve or inner shell of the embodiment shown in Figs. 15-22.

Fig. 24 is a side elevation partially shown in section similar to Fig. 21 of the uni-perforate valve shown in Fig. 23.

Fig. 25 is a reverse plan view of the uni-perforate valve shown in Fig. 23.

Fig. 26 is a vertical sectional view of a different embodiment of multi-perforate substantially spherical valve constructed in accordance with my invention employed as the nozzle closure means with a cork applied to a bottle neck.

Fig. 27 is an end elevation of an embodiment of my improved nozzle closure means with the nozzle thereof applied as the integral neck of a collapsible tube.

Fig. 28 and Fig. 29 are plan views respectively in open and closed position of the embodiment of my invention shown in Fig. 27.

Figs. 30 and 31 are vertical sectional views taken along the line 30—30 of Fig. 28 and the line 31—31 of Fig. 29.

Fig. 32 is a vertical sectional view taken along a line at right angles to the section lines of Figs.

30 and 31 and through the supporting trunnions thereof.

Fig. 33 is a side elevation partially broken away of the valve employed in the embodiment of my invention shown in Figs. 27-32.

Fig. 34 is a reverse plan view of the embodiment of valve shown in Fig. 33.

Figs. 35-40 illustrate respective successive steps in a method of making and assembling the embodiment of nozzle closure means shown in Figs. 27-34, Fig. 35 being a vertical sectional view through a nozzle of a collapsible tube pressure shaped in accordance with the first step of my improved method showing the integral collapsible tube nozzle pressure shaped from ductile or other suitable material to substantially cylindrical shape and provided with an annular groove therein near the upper end thereof, Fig. 36 being a vertical sectional view through a suitable apparatus in the act of pressing portions of said nozzle wall inwardly at diametrically opposite points below said groove to form diametrically opposite trunnions projecting radially within said nozzle, Fig. 37 being a disassembled view illustrating an improved inner shell or nozzle closure and an annular washer prior to assembly within the improved collapsible tube nozzle shown as in Fig. 35, in vertical section and after the trunnions have been formed therein, Fig. 38 showing a suitable assembly member in the act of inserting a spherical sector shaped inner shell closure member substantially of less diameter than said nozzle having recesses therein diametrically thereof at the lower end thereof within said nozzle mouth so that said trunnions may fit within said recesses to support said shell within said nozzle on a horizontal diametric axis, Fig. 39 showing a suitable apparatus in the act of inserting the annular washer shown in Fig. 37 within said nozzle mouth above said inner shell closure member to a position opposite said annular groove and Fig. 40 showing a suitable holding and crimping apparatus just after the final step of crimping the upper portion of the nozzle mouth downwardly over the upper surface of said shell closure member to force said annular washer within said annular groove and to form a leak-proof frustro hemi-spherical upper valve seat with said inner shell closure member maintained in leak-proof relatively oscillatable juxtaposition by said trunnions.

In the drawings, wherein like characters of reference generally indicate like parts throughout, 50 generally indicates a nozzle closure means for a container constructed in accordance with my invention and comprising a nozzle 52 having at its upper end an outer hemi-spherical shell 54 having dispensing hole means 56 therein and a wall 58 projecting downwardly from said outer hemi-spherical shell 54. As shown in the various embodiments, said downwardly projecting nozzle wall may be suitably shaped for attachment to a hole 60 in the top 62 of a container as in the embodiments of my invention shown in Figs. 1-11, 13 and 15-23, or may have the lower end 64 thereof shaped into the top wall of the container provided with the usual downward projecting flange 66 of such a top wall adapted to overlap the upper end of the container side wall as shown in Fig. 12, or may have the inner surface of said downwardly projecting flange 66 internally threaded as at 68 for detachable securement to an upper externally threaded bottle neck or container top as shown in Fig. 14, or it may be shaped for insertion within a hollow bottle cork 70 as in the embodiment of my invention shown in Fig. 26 or said downwardly projecting nozzle wall 58 may comprise the integral neck 72 of a collapsible tube 74 as in the embodiment of my invention shown in Figs. 27-40. If desired, the dispensing hole means 56 in the outer hemi-spherical shell 54 may comprise a suitable uni- or multi-perforate dispensing hole means such as the multi-perforate dispensing hole means 56 in the embodiment of my invention shown in Figs. 1-12 comprising the vertically spaced venticular slots 76 formed between the bars 78 forming integral parts of said outer shell 54 or said dispensing hole means 56 may comprise the uni-perforate preferably enlarged sector shaped dispensing hole means 56' as in the embodiment of my invention shown in Figs. 12-23 or it may comprise the dispensing hole means 56" of the outer frustro hemi-spherical shell forming said dispensing hole means at the top thereof as in the embodiments of my invention shown in Figs. 26-40.

I provide a relatively oscillatable inner at least partially hemi-spherical or spherical sector shaped inner shell closure member 80 of substantially the diameter of said outer shell, actually slightly less, adapted to be contained within said outer shell 54 and having a turning lug 82 projecting upwardly therefrom through said outer shell 54. I provide my improved inner shell of such a size and/or shape that it may be oscillatably moved by means of said turning lug 82 to a position completely shutting off the dispensing hole means 56 of said outer shell or to a position permitting free passage of the container contents through said dispensing hole means 56. This may be done by cutting away or removing a portion preferably a cooperating sector shaped portion in an edge portion of said valve as in the embodiment shown in Figs. 1-14 or by providing a suitably uni-perforate perforation 84 preferably by the provision of a sector shaped perforation 84 therein of a size substantially equal to the uni-perforate perforation 56 of said outer shell as shown in Fig. 23 and Fig. 24 or the multi-perforate perforations 84' as in the embodiment of my invention shown in Figs. 15-22 and the multi-perforate perforations 84' in the embodiment of my invention shown in Fig. 26 or the uni-perforate perforation 84 in the inner shell of the collapsible tube slightly smaller than the perforation 56" in the outer frustro hemi-spherical shell of the nozzle neck. In all embodiments, said cooperating dispensing hole means or portions 84 and 56 in the inner and outer shells respectively are adapted to be brought into alignment for dispensing purposes on movement of the turning lug 82 in one direction or are adapted on movement of the turning lug in the opposite direction to bring a solid portion of the inner shell wall in a position closing the dispensing hole means 56 in the outer shell. The turning lug 82 is preferably formed as an integral projection from the inner shell 80 and may be conveniently molded or otherwise pressure shaped therein in the course of its manufacture. For molding purposes in the embodiments of my invention shown, said turning lug 82 projects vertically upwardly from said inner shell 80 with the exception of the embodiment shown in Fig. 26 and in most embodiments from substantially the center portion thereof.

Suitable means are provided located substantially diametrically of said inner and outer shells for solely supporting said inner shell 80 within said outer shell to prevent said inner shell from dropping into the container and solely retaining it firmly against said outer shell in intimate nested leak-proof juxtaposition therewith and forming a horizontal diametric axis of oscillation for said inner shell. In my preferred embodiment, said means are preferably formed integrally of the material of said inner and outer shells and while said means may comprise the lugs or trunnions projecting diametrically outwardly from the inner valve member as in the embodiments of the invention shown in said application Ser. No. 751,734, now Patent No. 2,127,465, heretofore referred to or the diametric dimples in said valve member shown in said application and in said earlier Rest application Ser. No. 678,133, now Patent No. 2,126,814, with the diametric portions of the nozzle wall adjacent thereto integrally shaped to form cooperating axis of oscillation forming means therewith as shown in dotted lines in Fig. 26, for ease of manufacture and assembly I preferably provide the lower end 86 of the spherical sector shaped valve member shown or lower rim 86' of the hemi-spherical valve shown in Figs. 15–25 and 27–40 with the substantially hemi-cylindrical radial bores 88 projecting upwardly therein diametrically thereof adapted to receive the inwardly projecting trunnions 90 formed by integral portions of said outer shell pressure shaped to project diametrically radially within said bores 88 as said trunnions 90.

It is apparent that with my improved construction shown, the lower valve seat 92 formerly thought necessary in said applications heretofore described and as shown in Fig. 26, may be dispensed with and that said cooperating trunnions 90 and bores 88 provide means for solely supporting said inner shell 80 within said outer shell 54 to prevent said inner shell from dropping into the container and solely retaining said inner shell 80 firmly against said outer shell 54 in intimate nested leak-proof juxtaposition therewith and forming a horizontal diametric axis of oscillation for said inner shell.

I have shown in Figs. 1–12 and 15–22 an embodiment of my invention particularly adapted for dispensing powders of the type adapted to be dispensed in light streams as face or toilet powders, and to obtain such a result, provide either a multi-perforate dispensing portion 56 in the outer shell or a multi-perforate dispensing hole means 84' in said inner shell. In case however it be desired to dispense powder in bulk or large streams such as tooth powder, I provide a large uni-perforate dispensing opening 56 in the outer shell and with a cutaway portion 84 in the inner shell as in the embodiment of my invention shown in Figs. 1–14 or a correspondingly enlarged opening 84 or dispensing hole means in the inner shell 80 adapted to be brought into alignment with the enlarged dispensing opening 56' in the outer shell as shown in Figs. 23–25, and 27–40.

It will be observed that in all embodiments of my invention shown that the valve itself comprises a substantially spherical sector shaped valve 80 whether it be less than hemi-spherical by having substantially sector shaped portions at each end thereof removed as in the embodiment of my invention shown in Figs. 1–14 or whether it have a sector or other shaped dispensing opening portion removed in the body thereof to form the dispensing opening 84 as in the embodiment of my invention shown in Figs. 23–25 or the multi-perforate perforations forming the dispensing hole means as shown at 84' in Figs. 15–22 and 26 or the dispensing hole means 84 formed through the shell of the collapsible tube shell closure member 80 shown in Figs. 27–40.

As stated hitherto, the embodiment of my invention shown in Figs. 1–11, 13, and 15–23, comprises a separate nozzle comprising the usual hemi-spherical outer shell 54 and the wall 58 projecting integrally downwardly therefrom preferably substantially undulatingly shaped at the lower end thereof for detachable securement within a suitable hole 60 in the can top 62 and for this purpose as shown in Fig. 11, said wall 58 is provided near the lower end thereof with the annular flange 94 projecting radially outwardly therefrom formed by bending or pressure shaping a radial annular undulation 94 in said wall 58 and it is obvious that after the portion 96 of said wall below said flange 94 is inserted within the hole 60 in the can top 62, said portion 96 may be bent upwardly and radially outwardly in annular shape to compress the edge of the top wall of the can 62 adjacent said hole 60 between said annular flange 94 and annular outwardly bent portion 96 to firmly secure my improved nozzle closure means to the can top in a suitable manner.

In the embodiments of my invention shown in Figs. 1–25 specifically applied to powder cans, it is particularly desirable to render the same substantially leak-proof.

My improved method of assembly and construction of the embodiments of my invention as applied to a powder can or other container top is diagrammatically illustrated in Fig. 10 and it is obvious that for this purpose the nozzle 52 may be readily pressure shaped by pressing, stamping or otherwise from ductile or resilient material such as sheet metal blanks or molded of plastic material or formed of paper, glass or other suitable materials, to the desired configuration, the necessary dispensing hole means 56 being suitably simultaneously or otherwise stamped, molded or cut in said hemi-spherical outer shell 54, preferably as formed. To provide a construction in which the inner shell 80 may be oscillated to open or closed position while maintaining the inner shell 80 in intimate substantially leak-proof juxtaposition with the outer shell 54 and providing a maximum requisite amount of overlapping relationship between said inner and outer shells 80 and 54, to provide means to permit said turning lug to move to permit such relative oscillation of said inner and outer shells and maintain the desired cooperating overlapping coverage of said inner and outer shells 80 and 54, I provide the dispensing hole means 56 on one side portion of said hemi-spherical outer shell 54 and I provide a peripheral slot 98 extending substantially vertically therein from substantially the center of said outer shell 54' preferably for a longer distance than the height of said dispensing hole means 56 in said outer shell in the other or opposite side portion of said outer shell thus forming a sealing bridge 100 between said slot 98 and dispensing hole means 56, it being obvious that said bridge 100 between said slot 98 and dispensing hole means 56 reduces the powder loss to a minimum.

It is thus obvious that when assembled said slot 98 provides a means in which said turning lug 82 may readily oscillate and it is obvious that when said turning lug in the embodiment shown is lowered to the lower end of said slot 98 that the dispensing portion or hole means 84 in said inner shell will be brought opposite the dispensing hole means 56 in said outer shell and it is also apparent that when said turning lug is moved to the upper end of said slot 98 that a solid wall portion of said inner shell will be brought to a position closing the dispensing hole means 56 in said outer shell.

To positively retain the inner shell in a closed position closing the dispensing hole means 56 in said outer shell, I provide a radial internal depression 102 in the bridge 100 formed between said slot 98 and dispensing hole means 56 adapted to receive an integrally formed radial projection 104 on said inner shell substantially adjacent said turning lug 82 to releasably retain said inner shell in a closed position. If desired to retain said inner shell in an open position, a cooperating internal radial depression 106 may be provided in said outer shell 54 at the opposite or lower end of said vertical slot 98 adapted to receiving a cooperating integral radial projection 108 from said inner shell to positively releasably retain said inner shell in open dispensing position relative to said outer shell. If desired however, the intimate substantially leak-proof juxtaposition of said inner and outer shells may be permitted to be made so close by my improved construction that said inner shell may be retained in open or closed position by frictional engagement between said inner and outer shells without the necessity of said respective interlocking depressions and projections 102-104 and 106-108 respectively.

Thus as hitherto described, my invention includes a new method of manufacture of a nozzle closure means for containers as diametrically illustrated in Fig. 10 which comprises pressure shaping or otherwise forming a nozzle 52 from ductile material by pressing, stamping, molding or otherwise, having a substantially hemi-spherical outer shell 54 at its upper end, pressing portions of said nozzle wall radially inwardly at diametrically opposite points of said hemi-spherical outer shell to form the diametrically opposite trunnions 90 projecting radially within said shell and inserting within the base of said nozzle 52 and pressing upwardly therein a spherical sector shaped resilient inner shell valve closure member 80 of substantially the diameter of said outer shell 52 at the lower end of said nozzle having the bores 88 therein diametrically thereof in alignment with said diametric trunnions so that when said inner shell 80 is compressed compactly upwardly against said outer shell said trunnions 90 may slip past and snap within said recesses 88 due to the resiliency of one or both of shells to support said inner shell 80 within said nozzle 52 on a horizontal diametric axis in nested leak-proof juxtaposition with and abutting against the inner surface of said outer shell 54.

As stated hitherto, I believe I have provided a novel feature in an at least partially spherical valve closure member for a nozzle which comprises providing a multi-perforate dispensing portion 84' in said valve member 80 and I have shown in Fig. 26 the type of valve shown in said Rest application Ser. No. 678,133, now Patent No. 2,126,814, having at one end of the dispensing hole means therein the multi-perforate shell portion 84" adapted to dispense powder therein in fine streams or liquid therethrough in spray form.

As stated hitherto, I have shown in Figs 27–40 my invention as applied to the nozzle 52 integrally attached to a collapsible tube 74. In this instance, the nozzle 52 comprising the neck 72 of the collapsible tube is provided at its upper end with an outer frustro hemi-spherical shell 54" forming the dispensing hole means 56" at the top thereof. As is well-known, collapsible tubes are adapted to dispense pastes or liquids and for this purpose great difficulty has been experienced in providing an absolutely leak-proof nozzle closure means and so in this embodiment of my invention I preferably provide said outer frustro hemi-spherical shell portion 54" with the annular groove 110 near the top end thereof and the usual wall 58 of said neck 72 projecting downwardly from said hemi-spherical shell portion 54" forming an integral part of said collapsible tube 74. In the improved embodiment shown, the turning lug 82 preferably projects vertically upwardly for ease of molding of the valve from substantially the center of said inner shell member 80 through said dispensing hole means 56". Said turning lug 82" is preferably of generally rectangular or oval formation and preferably has the edges 111 thereof rounded to permit greater turning movement of said lug within said dispensing hole means 56" and to prevent any sharp edges from cutting into and distorting the rim of the nozzle adjacent said dispensing hole means 56". The dispensing hole means in collapsible tube nozzles is quite large relative to the diameter of the inner shell or valve closure member 80 and as it is desirable to keep a portion of said inner shell 80 at all times in contact with a suitable annular washer 112 constructed of rubber, fiber or other suitable washer material contained within said annular groove 110, I preferably employ an at least hemi-spherical valve closure member 80 provided with the suitable dispensing hole means 84 therein of considerable less diameter than the outer shell dispensing hole means 56" and I provide said inner shell 80 with a sealing skirt 114 projecting downwardly from the lower edge or hemi-spherical rim thereof in which said hemi-cylindrical radial bores 88 are formed and provided with the spherical outer surface 116 to permit ready oscillation thereof within said frustro hemi-spherical outer shell to at all times maintain a contact of a portion of said inner shell member 80 with said washer 112 and in order to permit the assembly of said inner shell member 80 within said outer shell 54 in the manner about to be described I provide said skirt 114 with the diametric slots 118 therein projecting vertically upwardly to said bores 88.

As shown in Figs. 35–40 it is obvious that employing my improved inner shell valve member 80, the trunnions 90 adapted to project diametrically radially inwardly of the nozzle wall 58 within the diametric radial bores 88 of my improved inner shell 80 to support said inner shell within said nozzle without the necessity of employing the lower valve seat as shown in Fig. 26, that I have provided improvements in the method of manufacture and assembly of the nozzle closure means for containers described in the application of myself, Ser. No. 751,734, now Patent No. 2,127,465, which comprises pressure shaping a substantially cylindrical nozzle 52 having an annular groove 110 therein near the upper end thereof from ductile or other material as diagrammatically illustrated in Fig. 35, pressing portions of said nozzle wall at diametrically opposite points of said outer shell 54 below said groove 110 inwardly to form diametrically opposite trunnions 90 projecting radially inwardly from said nozzle such as by means of the plungers 120 abutting diametrically opposite points of said nozzle wall while the neck 72 of the collapsible tube 74 is held between and supported by the suitable retaining members 122 and 124, as shown in Fig. 36, inserting a spherical sector shaped inner shell closure member 80 of slightly less diameter than said nozzle 52 with the lower end thereof having the slotted bores 118—88 therein diametrically thereof within said nozzle mouth 126 so that said trunnions 90 may fit within said bores 88 to support said inner shell 80 within said nozzle on a horizontal diametric axis by means of the specially shaped reciprocatable inserting tool 128 for this purpose as shown in Fig. 38, inserting the annular washer 112 within said nozzle mouth 126 above said inner shell closure member 80 to a position opposite said annular groove 110 by means of the annular stripper 130 downwardly reciprocal within a suitable washer retaining slot 132 in the holding and cutting member 134 having the center plug 136 adapted to abut the turning lug 82″ of the inner shell 80 and retain it in firm position within the mouth 126 while said annular stripper 130 is depressed to insert said annular washer 112 within said nozzle mouth 126 above said inner shell closure member 80 to a position opposite said annular groove 110 as shown in Fig. 39, (the holding and cutting member 134 is suitably swivably mounted so that in a previously offset position it may be sharply depressed over strip washer stock lying on a flat surface so that the cutting edges 131 thereof tapering to the lower end of the slot 132 may suitably cut through the washer stock to embed a suitable washer of the desired height, namely, the thickness of said washer stock within said lower end of said slot 132 so that when said holding and cutting member 134 is pivoted into the position shown in Fig. 39, the annular stripper 130 may be depressed as aforesaid to force the previously cut washer 112 out of the end of the slot 132 in the manner hitherto explained) and crimping the upper portion of said nozzle mouth 126 to force said annular washer 112 within said annular groove 110 and to force said upper portion 126 of said nozzle mouth downwardly over the upper surface of said shell closure member to form the outer frustro substantially hemi-spherical shell 54″ over said inner shell closure member 80 to form a leak-proof upper valve seat with said inner shell closure member 80 maintained in leak-proof relatively oscillatable juxtaposition therein by said trunnions 90 by means of the central reciprocatable holding member 138 having a central hole 140 therein for receiving said turning lug 82″ and providing the annular portion 142 adapted to press the inner shell member 80 downwards so that said trunnions 90 engaging within said bores 88 may rigidly support said shell member 80 while the partially spherical annular crimping surface 144 thereof compresses and inturns the upper end of the nozzle mouth 126 over the upper surface of said inner shell member 80 to form the frustro hemispherical outer shell portion 54 as shown in Fig. 40.

It is thus apparent that I have provided a type of nozzle closure means in which the outer shell may be readily pressure shaped or otherwise formed from suitable ductile material such as by stamping it as in the embodiments shown in Figs. 1–25 by molding it of plastic or other suitable material or by extruding it as in the embodiment shown in Figs. 26–40 or by forming it from paper or other suitable material and one in which the inner shell valve closure member may be similarly pressure shaped or molded or stamped. While the inner shell valve closure member may be made of cast metal or in any manner, it is preferably constructed of molded composition and it is thus obvious that certain features of my invention are constructed not only for their utility, but also to permit of their easy manufacture. Thus in the outer shell the vertical slot 98, the dispensing hole 56 or slots 76 may be readily cut in the stamping press. If the inner valve closure member 80 be constructed of molded composition material, great difficulty has been experienced in getting members of this configuration out of the mold and as is apparent from a close inspection of the drawings, the improved inner shell valve closure member is particularly constructed so that it may be readily withdrawn from a suitable type of hot or cold pressure or pressure injection or other molding apparatus. Thus the turning lug 82 as stated preferably projects vertically upwardly from the body of the shell so that it may be readily vertically withdrawn from the mold and the cutaway portions whether they merely shorten the circumferential length of the shell or actually form holes therein, may be readily formed on the mold in a manner to permit of the easy withdrawal thereof from the mold. In addition, in the embodiment of the valve closure member shown in Figs. 27–40 the upper edge of the dispensing hole means 84 is preferably constructed vertically for easy removal from the mold and the interior of the skirt preferably projects vertically downwardly for easy withdrawal from the mold even though the outer edge thereof is slightly spherically curved.

It is apparent therefore that I have provided a novel type of closure means for containers which not only has certain structural advantages enhancing its utility and consumer convenience, but also structural advantages which permit of its manufacture in a simple manner and as the component inner and outer shells thereof are adapted to be pressure shaped or molded, it is obvious that all cooperating utilitarian structural features thereof may be readily formed in the single two elements, namely, the inner and outer shells during their course of manufacture, and with the other advantages explained above.

I have employed the words "spherical sector shaped" in reference to the inner shell member 80 so as to include more or less than a hemisphere. A sector of a circle may be defined as a figure formed by an arc and two radii drawn to the ends of the arc and thus a circular sector may be more than a semi-circle. I am aware that there is occasionally a more definite meaning to spherical sector as meaning a figure generated by any plane sector when it revolves about its diameter which could not apply to more than a hemisphere. I have however employed the words "spherical sector" in its broader sense to include more than a hemisphere and when used in its narrower sense have employed a specific definition of less than hemi-spherical spherical sector shaped. I have employed the words "substantially spherical sector shaped" in reference to the valve shown in Figs. 8 and 9 although it is actually slightly more than a pure spherical sector and I have also employed the words "spherical sector" in reference to the valve shown in Figs. 33 and 34 although again this is slightly more than a hemi-spherical spherical sector. I chose the words "spherical sector" rather than "zone" which might have more aptly described the structures shown in Figs. 33 and 34 because this nomenclature failed as a generic term in including the valve as shown in Figs. 8 and 9. Were it not for the structures shown in Figs. 8 and 9, I would have employed the word "zone" as the base of the zone, it would appear, would more aptly have described the lower rim 86 than the present nomenclature and it might be well stated that in all embodiments of valve except the embodiments shown in Figs. 15–26, that the turning lug were located at the pole or center portion of the zone.

It is thus obvious that I have not only provided various novel improvements in nozzle closure means for various types of containers but also various improvements in their methods of manufacture and assembly with the advantages described above.

What I claim is:

1. Nozzle closure means for a container comprising a nozzle having at its upper end an outer hemi-spherical shell, having dispensing hole means therein and a wall projecting integrally downwardly therefrom, an inner partially spherical shell closure member of substantially the diameter of said outer shell contained within said outer shell having a turning lug projecting upwardly therefrom through said outer shell, means located substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

2. Nozzle closure means for a container comprising a nozzle having at its upper end an outer hemi-spherical shell having dispensing hole means therein and a wall projecting integrally downwardly therefrom, an inner less than hemi-spherical spherical sector shaped shell closure member of substantially the diameter of said outer shell contained within said outer shell having a turning lug projecting upwardly therefrom through said outer shell, and means located substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell.

3. Nozzle closure means for a container comprising a nozzle having at its upper end an outer hemi-spherical shell, having dispensing hole means therein and a wall projecting integrally downwardly therefrom, an inner partially spherical shell closure member of substantially the diameter of said outer shell contained within said outer shell having a turning lug projecting upwardly therefrom through said outer shell, cooperating means formed substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

4. Nozzle closure means for a container comprising a nozzle having at its upper end an outer hemi-spherical shell, having dispensing hole means therein and a wall projecting integrally downwardly therefrom, an inner less than hemi-spherical spherical sector shaped shell closure member of substantially the diameter of said outer shell contained within said outer shell having a turning lug projecting upwardly therefrom through said outer shell, and cooperating means formed substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell.

5. Nozzle closure means for a container comprising a nozzle having at its upper end an outer hemi-spherical shell, having dispensing hole means therein and a wall projecting integrally downwardly therefrom, an inner partially spherical shell closure member of substantially the diameter of said outer shell contained within said outer shell having a turning lug projecting upwardly therefrom through said outer shell, the lower rim edge of said inner shell having substantially hemi-cylindrical radial bores projecting upwardly therein diametrically thereof, the wall of said outer shell having integral portions projecting diametrically within said bores to provide inwardly projecting trunnions for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner hemi-spherical shell member having a portion thereof shaped to provide an open dispensing portion adapted to uncover said outer shell dispensing hole means on movement of said turning lug.

6. Nozzle closure means for a container comprising a nozzle having at its upper end an outer hemi-spherical shell, having dispensing hole means therein and a wall projecting integrally downwardly therefrom, and an inner less than hemi-spherical spherical sector shaped shell member of substantially the diameter of said outer shell contained within said outer shell having a turning lug projecting upwardly therefrom through said outer shell, the lower rim edge of said inner shell having substantially hemi-cylindrical radial bores projecting upwardly therein diametrically thereof, the wall of said outer shell having integral portions projecting diametrically within said bores to provide inwardly projecting trunnions for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell.

7. Nozzle closure means for a container comprising a nozzle having at its upper end an outer hemi-spherical shell, having multi-perforate dispensing hole means therein and a wall projecting integrally downwardly therefrom, an inner partially spherical shell closure member of substantially the radius of said outer shell contained within said outer shell having a turning lug projecting upwardly therefrom through said outer shell, means having portions located substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

8. Nozzle closure means for a container comprising a nozzle having at its upper end an outer hemi-spherical shell, having dispensing hole means therein and a wall projecting integrally downwardly therefrom, an inner partially spherical shell closure member of substantially the radius of said outer shell contained within said outer shell having a turning lug projecting upwardly therefrom through said outer shell, means having portions located substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having perforate dispensing hole means therein adapted to be aligned with said outer shell dispensing hole means on movement of said turning lug.

9. Nozzle closure means for a container comprising a nozzle having at its upper end an outer hemi-spherical shell, having dispensing hole means therein and a wall projecting integrally downwardly therefrom, an inner partially spherical shell closure member of substantially the radius of said outer shell contained within said outer shell having a turning lug projecting upwardly therefrom through said outer shell, means having portions located substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having multi-perforate dispensing hole means therein adapted to be aligned with said outer shell dispensing hole means on movement of said turning lug.

10. Nozzle closure means for a container comprising a nozzle having dispensing hole means and a valve seat therein, an at least partially spherical perforate shell closure member contained and rotatably mounted within said valve seat and a projection projecting outwardly through the end of said nozzle from said closure member to move the perforate portion thereof in and out of alignment with said nozle dispensing hole means and means located diametrically of said closure member and adjacent portion of said nozzle wall to provide a horizontal axis of oscillation for said closure member.

11. Nozzle closure means for a container comprising a nozzle having dispensing hole means and a valve seat therein, a partially spherical multi-perforate shell closure member contained and rotatably mounted within said valve seat and a projection projecting outwardly through the end of said nozzle from said closure member to move the perforate portion thereof in and out of alignment with said nozzle dispensing hole means and means located diametrically of said closure member and adjacent portion of said nozzle wall to provide a horizontal axis of oscillation for said closure member.

12. Nozzle closure means for a container comprising a nozzle having multi-perforate dispensing hole means and a valve seat therein, a partially spherical shell closure member contained and rotatably mounted within said valve seat and a projection projecting outwardly through the end of said nozzle from said closure member to move said closure member in and out of position completely closing said nozzle and means located diametrically of said closure member and adjacent portion of said nozzle wall to provide a horizontal axis of oscillation for said closure member.

13. Nozzle closure means for a container comprising a nozzle having dispensing hole means and a valve seat therein, an at least partially spherical multi-perforate closure member contained and rotatably mounted within said valve seat and a projection projecting outwardly through the end of said nozzle from said closure member to move the multi-perforate portion thereof in and out of alignment with said nozzle dispensing hole means and means located diametrically of said closure member and adjacent portion of said nozzle wall to provide a horizontal axis of oscillation for said closure member.

14. Nozzle closure means for a container comprising a nozzle having multi-perforate dispensing hole means and a valve seat therein, a partially spherical closure member contained and rotatably mounted within said valve seat and a projection projecting outwardly through the end of said nozzle from said closure member to move said closure member in and out of position completely closing said nozzle and means located diametrically of said closure member and adjacent portion of said nozzle wall to provide a horizontal axis of oscillation for said closure member.

15. Nozzle closure means for a container comprising a nozzle having at its upper end an outer hemi-spherical shell, having dispensing hole means on one side portion thereof and a peripheral slot extending substantially vertically therein from substantially the center thereof for a longer distance than the height of said dispensing hole means on the other side portion thereof and forming a sealing bridge between said slot and dispensing hole means and a wall projecting integrally downwardly therefrom, an inner partially spherical shell closure member of substantially the diameter of said outer shell contained within said outer shell having a turning lug projecting upwardly therefrom through said peripheral slot, and cooperating means having portions located substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

16. Nozzle closure means for a container comprising a nozzle having at its upper end an outer hemi-spherical shell, having dispensing hole means and a peripheral slot extending substantially vertically therein and a wall projecting integrally downwardly therefrom, an inner partially spherical shell closure member of substantially the diameter of said outer shell contained within said outer shell having a turning lug projecting upwardly therefrom through said peripheral slot, and cooperating means having portions located substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

17. Nozzle closure means for a container comprising a nozzle having at its upper end an outer hemi-spherical shell, having dispensing hole means on one side portion thereof and a peripheral slot extending substantially vertically therein from substantially the center thereof for a longer distance than the height of said dispensing hole means on the other side portion thereof and forming a sealing bridge between said slot and dispensing hole means and a wall projecting integrally downwardly therefrom, and an inner partially spherical shell closure member of substantially the diameter of said outer shell contained within said outer shell having a turning lug projecting vertically upwardly therefrom at substantially the center thereof through said peripheral slot, the lower rim edge of said inner shell having substantially hemi-cylindrical radial bores projecting upwardly therein diametrically thereof, the wall of said outer shell having integral portions projecting diametrically within said bores to provide inwardly projecting trunnions for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

18. Nozzle closure means for a container comprising a nozzle having at its upper end an outer hemi-spherical shell, having dispensing hole means and a peripheral slot extending substantially vertically therein and a wall projecting integrally downwardly therefrom and an inner partially spherical shell closure member of substantially the diameter of said outer shell contained within said outer shell having a turning lug projecting upwardly therefrom through said peripheral slot, the lower end of said inner shell having substantially hemi-cylindrical radial bores projecting upwardly therein diametrically thereof, the wall of said outer shell having integral portions projecting diametrically within said bores to provide inwardly projecting trunnions for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

19. Nozzle closure means for a container comprising a nozzle having at its upper end an outer frusto hemi-spherical shell forming dispensing hole means at the top thereof having an annular groove near the top end thereof and a wall projecting integrally downwardly therefrom, an annular washer contained within said annular groove, an inner hemi-spherical shell closure member of substantially the diameter of said outer shell contained with said outer shell having a turning lug projecting vertically upwardly therefrom at substantially the center thereof through said dispensing hole means having rounded edges for greater turning movement within said dispensing hole means, and to prevent distortion of the nozzle rim and cooperating means formed substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner hemi-spherical shell member having a cutaway dispensing portion to provide an open dispensing portion adapted to uncover said outer shell dispensing hole means when said turning lug is lowered and having a sealing skirt projecting downwardly from said lower edge thereof having a spherical outer surface.

20. Nozzle closure means for a container comprising a nozzle having at its upper end an outer frusto hemi-spherical shell forming dispensing hole means at the top thereof and a wall projecting integrally downwardly therefrom, an inner partially spherical shell closure member of substantially the diameter of said outer shell contained within said outer shell having a turning lug projecting upwardly therefrom through said dispensing hole means, and cooperating means formed substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof removed to provide an open dispensing portion adapted to uncover said outer shell dispensing hole means on movement of said turning lug.

21. Nozzle closure means for a container comprising a nozzle having at its upper end an outer frustro hemi-spherical shell forming dispensing hole means at the top thereof having an annular groove near the top end thereof and a wall projecting integrally downwardly therefrom, and an annular washer contained within said annular groove, an inner partially spherical shell closure member of substantially the diameter of said outer shell contained within said outer shell having a turning lug projecting upwardly therefrom through said dispensing hole means, and cooperating means formed substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

22. Nozzle closure means for a container comprising a nozzle having at its upper end an outer frustro hemi-spherical shell forming dispensing hole means at the top thereof and a wall projecting integrally downwardly therefrom, an inner partially spherical shell closure member of substantially the diameter of said outer shell contained within said outer shell having a turning lug projecting upwardly therefrom through said dispensing hole means having rounded edges for greater turning movement within said dispensing hole means and to prevent distortion of the nozzle rim, and cooperating means formed substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means when said turning lug is lowered.

23. Nozzle closure means for a container comprising a nozzle having at its upper end an outer frustro hemi-spherical shell forming dispensing hole means at the top thereof and a wall projecting integrally downwardly therefrom, an inner hemi-spherical shell closure member of substantially the diameter of said outer shell contained within said outer shell having a turning lug projecting vertically upwardly therefrom through said dispensing hole means, and cooperating means formed substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner hemi-spherical shell member having a portion thereof shaped to provide an open dispensing portion adapted to uncover said outer shell dispensing hole means on movement of said turning lug and having a sealing skirt projecting downwardly from the lower edge thereof having a spherical outer edge.

24. Nozzle closure means for a container comprising a nozzle having at its upper end an outer frustro hemi-spherical shell forming dispensing hole means at the top thereof having an annular groove near the top end thereof and a wall projecting integrally downwardly therefrom, an annular washer contained within said annular groove, and an inner hemi-spherical shell closure member of substantially the diameter of said outer shell contained within said outer shell having a turning lug projecting vertically upwardly therefrom at substantially the center thereof through said dispensing hole means having rounded edges for greater turning movement within said dispensing hole means and to prevent distortion of the nozzle rim, the lower rim edge of said inner shell having substantially hemi-cylindrical radial bores projecting upwardly therein diametrically thereof, the wall of said outer shell having integral portions projecting diametrically within said bores to provide inwardly projecting trunnions for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means when said turning lug is lowered and having a sealing skirt projecting downwardly from said hemi-spherical rim having a spherical outer edge and diametric slots projecting vertically to said bores.

25. Nozzle closure means for a container comprising a nozzle having at its upper end an outer frustro hemi-spherical shell forming dispensing hole means at the top thereof and a wall projecting integrally downwardly therefrom and an inner partially spherical shell closure member of substantially the diameter of said outer shell contained within said outer shell having a turning lug projecting upwardly therefrom through said dispensing hole means, the lower end of said inner shell having substantially hemi-cylindrical radial bores projecting upwardly therein diametrically thereof, the wall of said outer shell having integral portions projecting diametrically within said bores to provide inwardly projecting trunnions for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

26. A nozzle having at its upper end an outer hemi-spherical shell, having dispensing hole means on one side portion thereof and a peripheral slot extending substantially vertically therein from substantially the center thereof on the other side portion thereof and forming a sealing bridge between said slot and dispensing hole means and integral portions projecting diametrically radially within to provide inwardly projecting trunnions and a wall projecting integrally downwardly therefrom.

27. A nozzle having at its upper end an outer hemi-spherical shell, having dispensing hole means and a peripheral slot extending substantially vertically therein and integral portions projecting diametrically radially within to provide inwardly projecting trunnions and a wall projecting integrally downwardly therefrom.

28. A substantially spherical sector shaped inner shell closure member for a nozzle having a turning lug projecting upwardly therefrom and having at its lower end substantially hemicylindrical radial bores projecting upwardly therein diametrically thereof.

29. An at least hemi-spherical inner shell closure member for nozzles having dispensing hole means therein, a turning lug projecting upwardly therefrom, axis forming means formed diametrically thereof and a sealing skirt projecting downwardly from the lower rim thereof having a spherical outer surface.

30. An at least hemi-spherical inner shell closure member for nozzles having dispensing hole means therein, a turning lug projecting upwardly therefrom, substantially hemi-cylindrical radial bores projecting upwardly therein diametrically thereof at the lower rim thereof and a sealing skirt projecting downwardly from the lower rim thereof having a spherical outer surface and diametric slots projecting vertically to said bores.

31. Nozzle closure means for a container comprising a nozzle having at its upper end an outer hemi-spherical shell, having dispensing hole means therein and a wall projecting integrally downwardly therefrom, an inner partially spherical shell closure member of substantially the radius of said outer shell contained within said outer shell having a turning lug projecting upwardly therefrom through said outer shell, means having at least portions thereof located substantially diametrically of said inner and outer shells for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

32. Nozzle closure means for a container comprising a nozzle having at its upper end an outer hemi-spherical shell, having dispensing hole means therein and a wall projecting integrally downwardly therefrom, closure means including an inner partially spherical shell closure member of substantially the radius of said outer shell contained within said outer shell having a turning lug projecting upwardly therefrom through said outer shell and means having at least portions thereof located substantially diametrically of said closure means and outer shell for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

ALBERT H. CHURCH.